(No Model.)
L. NELKE.
INCIDENCE WINDOW.
No. 342,030. Patented May 18, 1886.
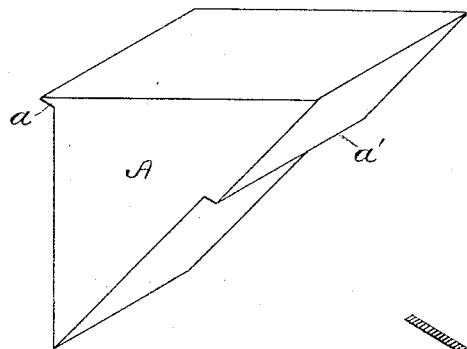
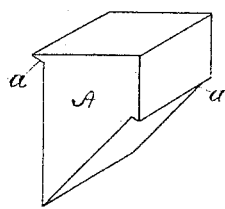
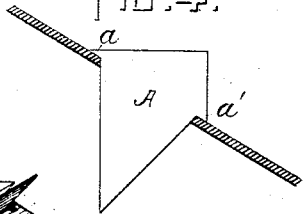
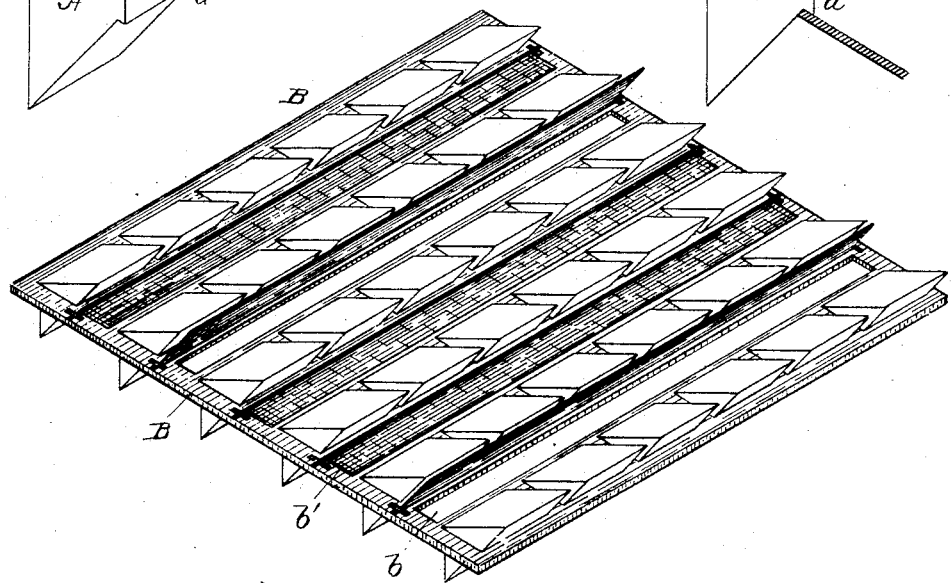
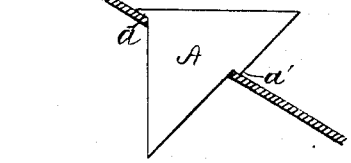
WITNESSES:
H. J. Riley
N. C. Bryant
INVENTOR
Louis Nelke,
BY R. S. Dyrenforth,
his ATTORNEY.
N. PETERS. Photo-Lithographer, Washington, D. C.

United States Patent Office.

LOUIS NELKE, OF BALTIMORE, MD., ASSIGNOR, BY MESNE ASSIGNMENTS, TO THE UNITED STATES PRISMATIC LIGHT COMPANY, OF SAME PLACE.

INCIDENCE-WINDOW.

SPECIFICATION forming part of Letters Patent No. 342,030, dated May 18, 1886.

Application filed October 23, 1885. Serial No. 180,777. (No model.)

*To all whom it may concern:*

Be it known that I, LOUIS NELKE, a citizen of the United States, residing at Baltimore, in the State of Maryland, have invented certain new and useful Improvements in Incidence-Windows; and I do hereby declare the following to be a full, clear, and exact description of the invention, such as will enable others skilled in the art to which it appertains to make and use the same.

My invention relates to incidence-windows or vault-lights.

The art of illuminating vaults by means of incidence-windows has long been in use; but difficulty is experienced in setting and arranging the lens in such manner that while affording the most light there may be no collection of water upon or leakage through the frame. Lenses have been set into frames; but they have been countersunk or set like steps of stairs, so that there could be no water-shed.

The object of my invention is to produce a vault-light or incidence-window of a simple, convenient, and comparatively inexpensive kind, one the lenses of which shall be so constructed and arranged as to receive and afford the maximum quantity of light, and which shall be water and weather proof, though, if desired, capable of ventilation.

My invention consists, first, in a lens of prismatic or approximately prismatic form having shoulders or offsets, one being situated on one side near the top at the plane of incidence, and the other being on the opposite side at the plane of reflection and below the first, whereby the lens may be set on a frame slanting, when in position, in such manner that its upper surface will be nearly or quite horizontal, being thus set in the most appropriate position to receive light and transmit the same, and forming a plug or stopper perfectly to exclude water and to shed it.

The invention consists, furthermore, of the combination of the lens or of lenses of the kind described with a frame.

The invention consists, finally, in the entire structure, with or without openings between the lenses, provided with covers that may be opened and closed for the purpose of ventilation.

In the accompanying drawings, forming part of my specification, like letters of reference designate corresponding parts.

Figure 1 is a perspective view of one form of lens constructed in accordance with my invention. Fig. 2 is a view showing a part of the frame in longitudinal section, with a lens of the form shown in Fig. 1 in position. Fig. 3 is a perspective view of another form of lens constructed in accordance with my invention. Fig. 4 is a view showing a part of the frame in longitudinal section, with a lens of the form shown in Fig. 3 in position. Fig. 5 is a perspective view showing lenses in position on a frame in accordance with my invention, and with two of the openings in the frame uncovered and three covered.

The lenses A are of a prismatic or approximately prismatic form, and held in place by means of shoulders or offsets $a$ and $a'$ on their sides, and rest horizontally on a frame slanting when in position. The offset $a$ is situated on one side near the top at the plane of incidence, and the offset $a'$ is situated on the opposite side at the plane of reflection and lower down than the offset $a$. The offsets, as clearly shown in Figs. 2 and 4, serve to hold the lenses in position on the frame. The light striking the plane of incidence of each lens penetrates to its plane of reflection, and is thrown into the vault, the lenses being so arranged that their planes of incidence are level, or nearly so, whereby they will receive the greatest amount of light, and the maximum quantity thereof will be transmitted to the vault.

My device, besides fully serving all the purposes of an incidence-window, serves completely to exclude and shed water. The lenses are not countersunk, but rest in the frame as plugs, and as they project there can be no collection of water upon them; but this runs up on the frame, which, by its slanting postion, freely and perfectly sheds it. This arrangement is especially advantageous, as it makes the fitting cleanly and perfectly water-tight.

Another feature of my invention resides in the capability of ventilation. In Fig. 5 are shown slots $b\ b$ between the rows of lenses, and provided with covers that are capable of being opened and closed. These covers are marked $b'\ b'$, fit perfectly water-tight, and may in rough or cold weather be entirely closed, thus presenting a surface perfectly water and weather proof. The slots may be continuous or not, and may be arranged longitudinally, if desired.

In some cases I may dispense with ventilation, and not have the frame provided with openings.

Having thus described my invention, what I claim, and desire to secure by Letters Patent, is—

1. A lens of prismatic or approximately prismatic form having shoulders or offsets, one being on one side near the top at the plane of incidence, and another being situated on the opposite side at the plane or reflection below the other, substantially as described.

2. The combination of a lens of prismatic or approximately prismatic form having shoulders or offsets, one on one side near the top at the plane of incidence and the other on the opposite side at the plane of reflection and below the other, with a frame, the lenses being held in suitable position in or upon the frame by the shoulders or offsets, substantially as described.

3. A vault-light or incidence-window consisting of the frame provided with the described lenses, and having one or more lateral openings between the lenses, to be provided with suitable covers, substantially as set forth.

In testimony whereof I affix my signature in presence of two witnesses.

LOUIS NELKE.

Witnesses:
R. G. DYRENFORTH,
W. W. MORTIMER.